US005425898A

United States Patent [19]

Phillippi et al.

[11] Patent Number: 5,425,898

[45] Date of Patent: Jun. 20, 1995

[54] THICKENING SYSTEM FOR INCORPORATING FLUORESCENT WHITENING AGENTS

[75] Inventors: Martin A. Phillippi, Pleasanton; John D. Decatur, San Francisco, both of Calif.

[73] Assignee: The Clorox Company, Oakland, Calif.

[21] Appl. No.: 126,920

[22] Filed: Sep. 27, 1993

[51] Int. Cl.[6] .............................................. C09K 11/06

[52] U.S. Cl. .............................. 252/301.23; 252/95; 252/96; 252/100; 252/102; 252/186.26; 252/186.28; 252/186.29; 252/301.21; 252/315.1; 252/545; 252/558

[58] Field of Search .................. 252/95, 96, 100, 102, 252/186.26, 186.28, 186.29, 301.21, 301.23, 315.1, 545, 558

[56] References Cited

U.S. PATENT DOCUMENTS 4,764,302 8/1988 Baker et al. .................... 252/301.23

*Primary Examiner*—Richard L. Raymond

*Attorney, Agent, or Firm*—Majestic, Parsons, Siebert & Hsue

[57] ABSTRACT

A freeze-thaw stable thickening system for laundry products incorporating low levels of an acid-insoluble fluorescent whitening agent, a nonionic surfactant that comprises substantially of hydrophilic polyethoxylated alcohol oligomers, a fatty acid soap, and acidic pH adjusting agent is provided. The thickening system may be formulated with a bleaching product and preferably with a peroxide bleach product. Preferred polyethoxylated alcohol oligomers comprise a mixture of alcohols having the structure $$CH_3(CH_2)_n(OCH_2CH_2)_xOH$$

wherein n is about 11 to about 14 and x is from 0 to about 20 and wherein the average number of ethylene oxide groups per molecule is about 6–10, and preferably about 7. Preferably the total amount of polyethoxylated alcohols having x equal to 0, 1, or 2 comprise less than about 10% by weight of the mixture of polyethoxylated alcohols.

28 Claims, 5 Drawing Sheets

THICKENING SYSTEM FOR INCORPORATING FLUORESCENT WHITENING AGENTS

FIELD OF THE INVENTION

This invention relates to a thickening system for cleaning products comprising a surfactant, a fluorescent whitening agent, and fatty acid or esterified fatty acid soap, and more particularly to a thickened liquid oxidant bleach laundry composition which exhibits freeze-thaw stability.

BACKGROUND OF THE INVENTION

Much prior art has addressed the development of thickened household laundry products such as detergents and bleaches. Consumer preference for such thickened products is well documented, and applications include prewash products and hard surface cleaners which require concentrating the active ingredients and/or the capability to cling to surfaces. Typical thickeners of the prior art include surfactants, polymers, or combinations thereof. A number of disadvantages are associated with such prior art thickening systems. For instance, to the extent that a thickened laundry product requires the addition of components solely for thickening, the cost of the product is increased. Moreover, many prior art thickeners are incompatible with non-chloride bleaches, such as peroxygen or peracid bleaches.

Generally, prior art thickened compositions incorporating fluorescent whitening agents require a high solids (fluorescent whitening agent) content, or additional components, such as polymers, to achieve sufficient thickening. In addition, aqueous suspensions of fluorescent whitening agents of the art are usually not stable at acidic pHs.

A thickening system which overcame some of these deficiencies by incorporating low levels of a fluorescent whitening agent as part of the thickening system was described in U.S. Pat. No. 4,764,302, inventors Baker et al. One embodiment of the Baker et al. aqueous bleach composition system comprises a nonionic polyethoxylated alcohol surfactant, an acid insoluble fluorescent whitening agent, and a soap to synergistically increase viscosity. Preferred surfactants include polyethoxylated alcohols manufactured by the Shell Chemical Company under the tradename "Neodol." Neodol 25-7, which is a mixture of 12 to 15 carbon chain length alcohols with about 7 ethylene oxide groups per molecule, is particularly suitable.

The Baker thickener can be used to thicken a variety of liquid laundry product compositions that contain bleaches and detergents. Typically, the thickening system is used in amounts effective to attain an intermediate viscosity (200–500 centipoise) for products such as hard surface cleaners which need sufficient residence time for use on non-horizontal surfaces. More typically, the thickening system may be formulated to have a viscosity on the order of 100–300 centipoise for use with a laundry product to enhance pourability and allow concentration of the product on heavily stained fabrics. The bleach used preferably is a peroxygen or peracid bleach, although virtually any oxidant capable of operating at acidic pHs could be used.

Despite these advantages, thickened liquid laundry products often exhibit freeze-thaw instability which is characterized by marbling and flaking of the final consumer product.

SUMMARY OF THE INVENTION

It is an object of the present invention to provide a freeze-thaw stable thickening system incorporating low levels of a fluorescent whitening agent (FWA) as part of the thickening system.

It is another object of the present invention to provide a freeze-thaw stable thickened peroxygen bleach composition incorporating surfactants and fluorescent whitening agents.

Yet another object of the present invention is to provide a thickening system for forming freeze-thaw stable cleaning and bleaching compositions comprising a FWA-stabilizing amount of a nonionic surfactant that comprises substantially of hydrophilic polyethoxylated alcohol oligomers.

These and other objections are accomplished with the present invention which is based in part on the discovery that the freeze-thaw (F/T) stability of liquid laundry compositions that are thickened with a system comprising of nonionic surfactants, fluorescent whitening agents, and soap, can be significantly improved by reducing the amount of hydrophobic oligomers in the surfactant. The fluorescent whitening agent stabilizing nonionic surfactants preferably comprise substantially of hydrophilic polyethoxylated alcohol oligomers.

In one embodiment, the inventive thickening system comprises in aqueous solution: an acid-insoluble fluorescent whitening agent that comprises about 0.1 to 10 weight percent of said aqueous solution; a FWA-stabilizing amount of a nonionic surfactant that comprises substantially of hydrophilic polyethoxylated alcohol oligomers; a stabilizing-effective amount of fatty acid soap; and a pH adjusting agent in an amount sufficient to precipitate the FWA as a colloidal particle.

Particularly useful surfactants include a mixture of polyethoxylated alcohols having the structure $$CH_3(CH_2)_n(OCH_2CH_2)_xOH$$

wherein n is about 11 to about 14 and x is from 0 to about 20 and wherein the average number of ethylene oxide groups per molecule is about 6–10, and preferably about 7. Preferably the total amount of polyethoxylated alcohols having x equal to 0, 1, or 2 comprise less than about 10% by weight of the mixture of polyethoxylated alcohols.

DETAILED DESCRIPTION OF THE PREFERRED EMBODIMENT

Figure 1:
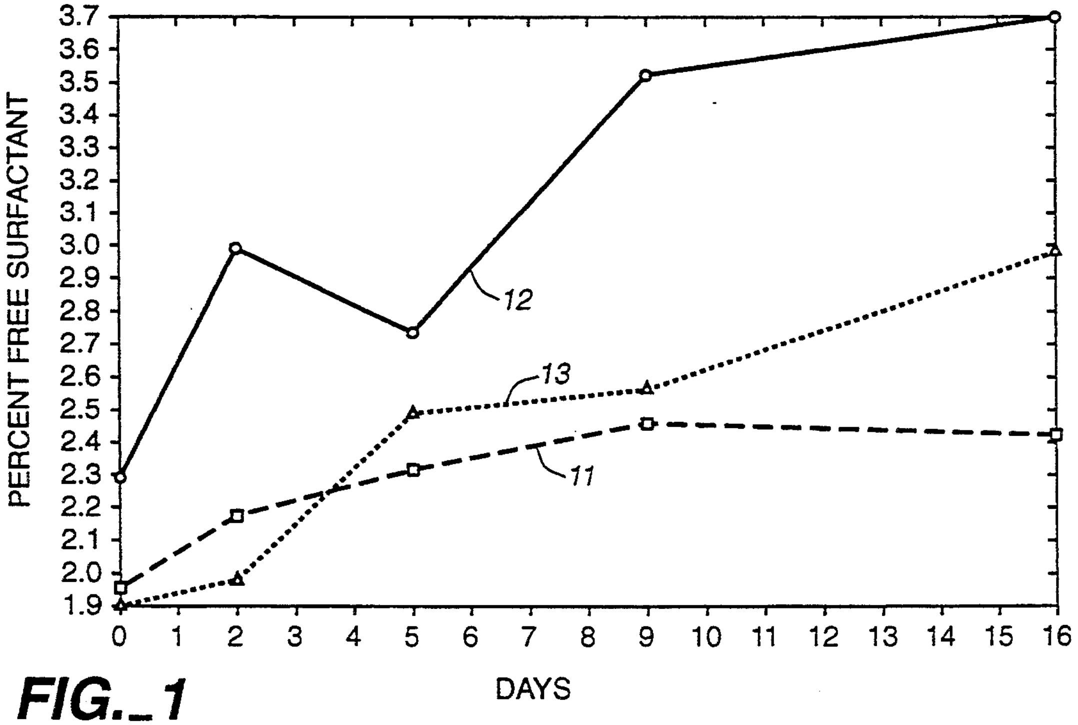
FIG. 1 is a graph showing the concentration of free, non-adsorbed surfactant versus time (days) for a thickened bleach composition comprising of Neodol 45-7.

The present invention is based in part on the discovery that the freeze-thaw (F/T) stability of liquid laundry compositions that are thickened with a system comprising of nonionic surfactants, fluorescent whitening agents, and soap, can be significantly improved by reducing the amount of hydrophobic oligomers in the surfactant. The fluorescent whitening agent stabilizing nonionic surfactants preferably comprise substantially of hydrophilic polyethoxylated alcohol oligomers, and more preferably the nonionic surfactants comprise a mixture of polyethoxylated alcohols having the following structure:

$$CH_3(CH_2)_n(OCH_2CH_2)_xOH$$

wherein n is about 11 to 14 and x is from 0 to about 20 and wherein the average number of ethylene oxide groups per molecule is about 6–10, and preferably about 7. Preferably the total amount of polyethoxylated alcohols having x equal to 0, 1, or 2 comprise less than about 10% by weight of the mixture of polyethoxylated alcohols. Hydrophobic polyethoxylated alcohol oligomers generally refer to polyethoxylated alcohols where x is 0, 1, or 2 while hydrophilic polyethoxylated alcohol oligomers generally refer to polyethoxylated alcohols where x is 3 or greater.

It was found that thickened liquid laundry products exhibited little or none of the marbling and flaking normally associated with conventional liquid laundry compositions. Experiments analyzing and comparing conventional (or standard) thickened peroxygen bleach compositions and the inventive compositions are described hereinbelow.

Preparation of Standard Thickened Peroxygen Bleach Composition.

A thickened peroxygen bleach composition described generally in U.S. Pat. No. 4,764,302, inventors Baker et al., issued Aug. 16, 1988, and incorporated herein by reference, was prepared. Specifically, the thickened composition, which will be referred to as the "Standard Bleach Composition," comprised (on a weight basis) 71.02% deionized water, 17.94% surfactant preblend, 10.00% hydrogen peroxide (35%), and 1.04% triple acid preblend. The triple acid preblend and surfactant preblend had the following ingredients:

| | |
|---|---|
| | Triple Acid Preblend |
| 62.70% | deionized water |
| 11.53% | phosphonate |
| 23.18% | phosphoric acid (93%) |
| 2.59% | sulfuric acid (93%) |
| | Surfactant Preblend |
| 22.299% | Neodol 45-7 |
| 0.055% | antioxidant |
| 72.380% | deionized water |
| 1.236% | 50% NaOH |
| 1.784% | Phorwite RKH (brightener) |
| 2.17% | capric acid |
| 0.017% | acid blue dye (80) |
| 0.055% | fragrance oil |

Phorwite™ RKH is manufactured by Mobay Chemicals. Neodol 45-7 is a mixture of 14 and 15 carbon chain length polyethoxylated alcohols with about seven ethylene oxide groups per molecule and is manufactured by the Shell Chemical Company. Set forth in Table 1 are typical distributions of ethoxylate adducts for six Neodol polyethoxylated alcohol mixtures.

TABLE 1

Typical Weight Percent Distribution of Ethoxylate (EO) Adducts of Various Neodol™ $RO(CH_2CH_2O)_nH$ Mixtures

| EO n | 1. 23-6.5<br>2. 25-7<br>3. 45-7 | 4.45-7T | 5. 25-9 | 6.45-13 |
|---|---|---|---|---|
| 0 | 3 | 0.7 | 2 | 0.7 |
| 1 | 2 | 1 | 1 | 0.5 |
| 2 | 4 | 3 | 2 | 0.5 |
| 3 | 5 | 5 | 3 | 0.9 |
| 4 | 6 | 7 | 4 | 1 |
| 5 | 7 | 8 | 5 | 2 |
| 6 | 7 | 9 | 5 | 2 |
| 7 | 8 | 8 | 6 | 3 |
| 8 | 8 | 9 | 7 | 4 |
| 9 | 8 | 8 | 8 | 5 |
| 10 | 8 | 8 | 8 | 6 |
| 11 | 7 | 7 | 8 | 7 |
| 12 | 6 | 6 | 8 | 7 |
| 13 | 5 | 5 | 7 | 8 |
| 14 | 4 | 4 | 6 | 8 |
| 15 | 3 | 3 | 5 | 8 |
| 16 | 2 | 2 | 4 | 7 |
| 17 | 2 | 1 | 3 | 7 |
| 18 | 1 | 1 | 3 | 6 |
| Higher | 4 | 4 | 5 | 19 |

This data was provided by The Shell Chemical Company. The weight percent for 45-7T and 45-13 totals to 99.7 and 102.6, respectively. It is believed that the apparent discrepancies are caused by the rounding out (or truncation) of the actual values to generate the nominal values as shown.

The nomenclature for each Neodol™ mixture is such that the first two digits refer to the carbon chain lengths and the last number refers to the average number of ethylene oxide groups per molecule. For instance, Neodol 25-7 is a mixture of 12 to 15 carbon chain length polyethoxylated alcohols and Neodol 45-7 is a mixture of 14 and 15 carbon chain length polyethoxylated alcohols; for both mixtures there are an average of seven ethylene groups per molecule. Neodol 45-7T refers to a product derived from the Neodol 45-7 mixture that is substantially depleted in $EO_0$, $EO_1$, and $EO_2$. For Neodol 45-7T, the average number of ethylene oxide groups per molecule remained at about seven.

The Standard Bleach Composition is a flocculated dispersion of submicron sized precipitated brightener particles that is sterically stabilized by nonionic surfactants, i.e., Neodol 45-7, and capric acid. A dispersion is a two-state system in which finely divided particles, the Phorwite RKH brightener, are dispersed throughout a continuous phase. The colloid exhibits an aging process in which it is freeze-thaw unstable until it reaches maturity. The symptoms of the F/T problem include clumping and marbling. Marbling refers to color modulation within the sample and clumping refers to the formation of millimeter sized, flake-like globules which can be seen floating throughout the product. For the Standard Bleach Composition, clumping is the more serious of the two problems associated with F/T instability. The colloid also occasionally exhibits phase instability.

As will be described further below, it has been discovered that freeze-thaw stability can be enhanced significantly by replacing Neodol 45-7 with a mixture of polyethoxylated alcohols which are more hydrophilic. For instance, by replacing Neodol 45-7 in the Standard Bleach Composition with Neodol 45-7T, F/T instability is essentially eliminated.

Stable and Unstable Systems

Before discussing the experiments, it may be helpful to define what are meant by "stable" and "unstable" when used to describe several aspects of a dispersion. Stable can describe the extent to which small particles remain uniformly distributed throughout a sample (lack of sedimentation) or, more generally, the extent to which any separation occurs. This is called phase stability. The second meaning of stable refers to particle-particle interactions and is called particle stability. Particles that have come together may simply touch which is termed flocculation or aggregation, or they may fuse together or coalescence, making a new, coarser particle. The latter phenomenon is termed coagulation. Dispersions with high particle stability have free, non-touching particles while less stable ones are flocculated and unstable systems rapidly coalesce into large particles. Finally, freeze-thaw stability refers to the extent that a system is able to retain its essential characteristics after being frozen and then allowed to thaw.

A system need not possess all three types of stability simultaneously, i.e., systems exhibiting one form of stability may be unstable with respect to another. For example, a dispersion that has high particle stability allows the particles to move freely past each other and settle quickly on the bottom forming a dilatant, or close packed, sediment. This system possesses poor phase stability but high particle stability. Thus, it is not sufficient to simply refer to a dispersion as stable or unstable; the type of stability must be specified. Most preferably a thickened bleach composition is a dispersion that exhibits good stability in all three categories and improvements in F/T stability should not result in unacceptable phase or particle stability.

The following comparative studies demonstrate the superiority of the inventive thickened composition relative to conventional thickening compositions.

EXPERIMENTAL PROCEDURES AND ANALYSES

Investigation of the F/T problem was approached in three ways. The first set of experiments attempted to correlate a measurable quantity possessed by the unfrozen colloid to the change in F/T stability. These experiments included time-dependent measurements of particle size, rheology, and surfactant adsorption. The second set analyzed the colloid after it had failed the F/T stability test and included analysis of the F/T flakes. The third set involved rational changes to the Standard Bleach Composition formula to affect F/T stability. (A composition produced by changing the formulation of the Standard Bleach Composition is referred to herein as a modified Standard Bleach Composition.) As described below, one of the main findings of this work is that the F/T instability of the Standard Bleach Composition is not the result of particle coagulation but is due to the insolubility of hydrophobic surfactant oligomers.

1. Particle Size Analysis

The primary particle size distribution of the precipitated fluorescence brightener crystals was characterized by dynamic light scattering. The distributions of F/T stable and unstable compositions were very polydisperse with particles ranging from tens of nanometers to microns. (The F/T stable dispersion was a modified Standard Bleach Composition, as described below.) The two distributions are very similar and it is unlikely that changes in particle size distribution are responsible for the F/T ripening process.

2. Time-Dependent Study: Surfactant Adsorption and Rheology

For this study, a sample of Standard Bleach Composition was prepared that would fail the F/T thaw test initially but over the course of several days would become F/T stable. The free surfactant and rheological properties were periodically measured. Although after 15 days this sample had not yet achieved F/T stability, it had changed substantially from a F/T rating of 1 initially to 3 at day 15. The F/T rating is a visual determination of the amount of flaking and marbling after F/T; the scale range is from 1 to 5 with 1 being the worst. A score of 1, 2, or 3 is failing while 4 or 5 is passing. (It is difficult to produce product that matures in a controlled, timely manner.)

The amount of free, non-adsorbed surfactant as a function of time (days), as determined by NMR (curve 11), chromatography method 1 (curve 12), and chromatography method 2 (curve 13), is shown in FIG. 1. (The NMR and chromatographic methods 1 and 2 technologies are described below.) All three methods show desorption of the surfactant over time as the colloid matures. The methods differ, however, in the actual value of free surfactant. The methods range from 1.9% to 2.3% free surfactant at day zero and from 2.4% to 3.7% at day 16. The results from the NMR method and chromatography method 2 are reasonably similar. The percent free surfactant at maturity is likely between 2.5 and 3.0.

Figure 2:
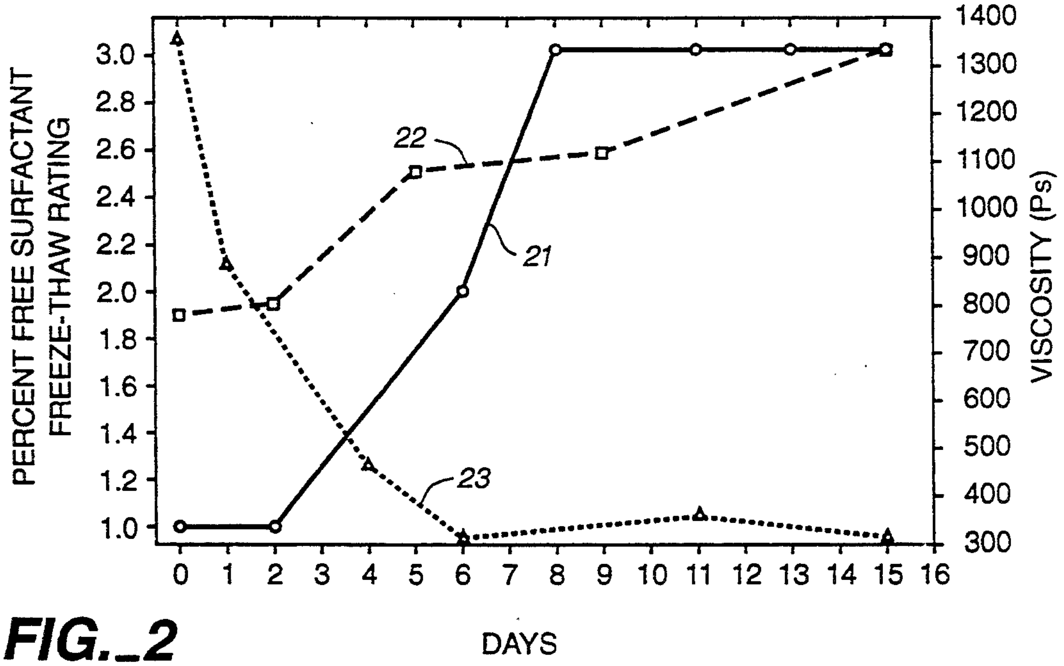
FIG. 2 is a graph comparing the freeze-thaw rating, viscosity and percent free surfactant versus time (days) for a thickened bleach composition comprising of Neodol 45-7.

The F/T stability rating correlated well with the desorption of surfactant; improvement in the F/T rating was accompanied by surfactant desorption. The F/T ratings (curve 21) measured over time (days) are shown in FIG. 2. Also shown are the percent free surfactant (curve 22) and zero-shear viscosity (curve 23) versus time measurements for the sample.

The desorption for this sample differs from those for small scale, $D_2O$ samples that were produced at 50° F. (10° C.), 70° F. (21.1° C.), and 100° F. (37.8° C.). For the 70° F. sample, it was found that the surfactant adsorbed over time while the degree of adsorption for the 50° F. sample changed very little. The amount of adsorption at time zero was greater-at lower processing temperatures. These differences in adsorption may be due to the different methods of production for the two samples or differences between $D_2O$ and $H_2O$. Thus, it appears that F/T maturation is not always accompanied by adsorption, but is accompanied by changes in the level of adsorption, i.e., either adsorption or desorption. The colloid structure is certainly changing over time but little insight into the nature of these changes can be deduced from this data. Selective adsorption of certain oligomers may also be occurring over time. Initial attempts to directly measure differences in oligomer distribution in the supernatant, however, showed no differences within experimental error. The F/T flakes themselves were analyzed for oligomeric effects as reported below.

Figure 3:
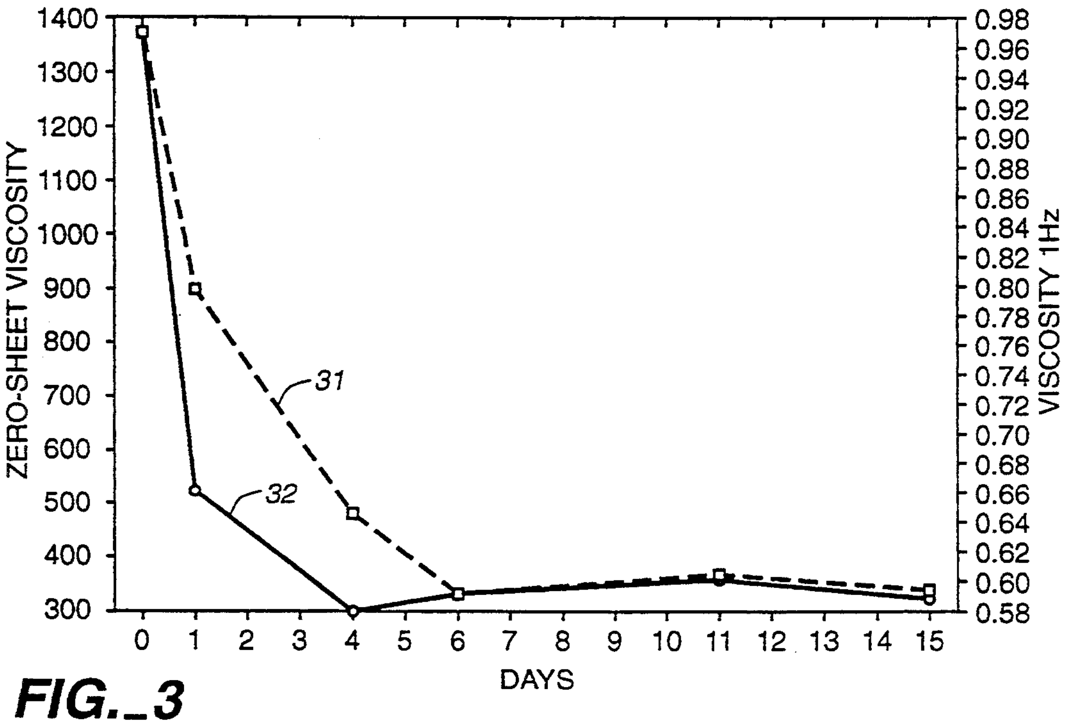
FIG. 3 is a graph of zero-shear viscosity and 1 Hz oscillatory viscosity measurements versus time for a thickened bleach composition.
Figure 4:
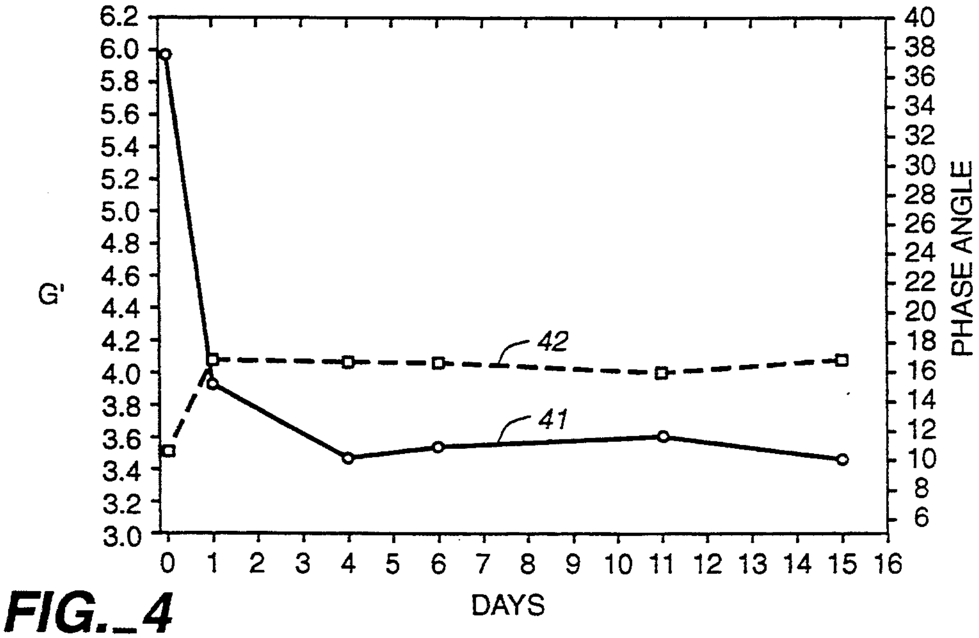
FIG. 4 is a graph of the storage (elastic) modulus and phase angle measurements versus time for a thickened bleach composition.

Shown graphically in FIG. 3 are the zero-shear viscosity (curve 31) and 1 Hz oscillatory viscosity (curve 32) data measured as a function of time (days) for the sample. (Rheology measurement techniques are further described below.) In FIG. 4, the storage (elastic) modulus, G′ (curve 41) and phase angle, δ, (curve 42) are plotted against time. The phase angle, which is defined as the arctan (G″/G′) where G″ is the loss modulus, is a measure of the viscoelasticity of the colloid. Angles near zero indicate elastic behavior while angles near 90 indicate pure viscous behavior. The zero-shear viscosity decreases rapidly from nearly 1400 Ps at day zero to 900 Ps at day one to between 300 and 500 Ps at days four and beyond. The phase angle jumps from 10 at day zero to 17 on day one and remains relatively constant thereafter. Thus, as the colloid becomes more F/T Stable, there is a large decrease in the viscosity, a small decrease in the elastic character, and more free, non-adsorbed surfactant present.

Sample preparation for NMR and Chromatography.

For the above time dependent study, the Standard Bleach Composition was produced at 69° F. and samples were ultracentrifuged at 100,000 rpm for 1 hr. The resulting supernatant contained two layers. These two layers were combined and analyzed by NMR and chromatography.

A. NMR method. The supernatant was analyzed directly by $^1H$ NMR. The integral of the ethoxylate peak was used for quantitation by comparison to a standard curve. The curve, which was linear, was generated by measuring the integral of samples of varying Neodol 45-7 concentration. A water-suppression sequence was required because of the overwhelming signal due to $H_2O$. A pulse sequence was used which employs a selective excitation window. The $H_2O$ peak was not excited while the rest of the spectrum received relatively uniform excitation. The $90^0$ $^1H$ pulse width was lengthened to 15μs, which is required by the pulse sequence, by attenuating the pulse power by 3 dB. The linearity of the standard curve and good reproducibility indicated the validity of the suppression method.

The NMR method relies on the condition that there is little selective adsorption of different chain length ethoxylate (EO) oligomers. The reason is that it is the number of moles of the repeating EO unit and not the number of moles of surfactant that is measured. Selective adsorption did not contribute significantly to the error in this measurement.

B. Chromatographic methods. Chromatography was performed using two different methods. Method 1: An aliquot of the supernatant was shot onto a separation pack, washed with water, eluted with organics, and dissolved in the appropriate solvent for HPLC. Reverse phase HPLC was performed with detection by laser light scattering. Peak area integrals were compared with a two point standard curve of known Neodol 45-7 concentration. Method 2: An aliquot of supernatant was dissolved in 25 ml of methanol which contained $C_{12}EO_6$ as an internal standard. This solution was then shot directly into a Hypersil $C_{18}$ reverse phase column using a methanol/water gradient. Detection was accomplished by laser light scattering. A series of four known Neodol solutions with different concentrations were used to construct a calibration curve which was very linear.

Rheological Measurements. Zero-shear viscosities were measured with a Bohlin-CS controlled stress rheometer. The instrument was run in the constant stress mode (creep experiment) using a C25 concentric cylinder measuring geometry at 0.06 Pascals stress level, for 60 seconds creep and 60 seconds recovery time, at 25° C. The zero-shear viscosity is evaluated from the viscoelastic response curve and extrapolated to zero time. Linearity of the viscoelastic response is constantly evaluated by the software during the experiment. Generally, samples that were F/T unstable had much higher zero-shear viscosities and never approached true linear behavior within the 60 seconds creep time. The opposite was true for F/T stable samples, which quickly achieved linear behavior within 30 seconds. Phase angles and storage, G′, and loss, G″, moduli data were collected using the Bohlin VOR controlled strain rheometer, run in the strain sweep mode at 1 Hz and at 25° C. All reported data were taken from the linear viscoelastic region, which generally lasted from 10 to 20 mrad.

3. Cloud Point Determination

Ultracentrifugation of the Standard Bleach Composition (and modified forms thereof) was often performed to remove brightener from the supernatant for analytical analysis. Phase separation of this supernatant was observed which has now been identified as a cloud point phenomenon. The cloud point is sensitive, in general, to the presence of additives such as electrolytes and other surfactants.

The cloud points for mixtures of Neodol 45-7 and Neodol 45-7T with capric acid were determined. Since salts affect the cloud point, these mixtures were made as analogous to the Standard Bleach Composition as possible. Thus, NaOH was added followed by the tri-acid mixture (Dequest 2000/$H_2SO_4$/$H_3PO_4$) to bring the acidity to about pH 4.

It was extremely difficult to determine the cloud points of 0.4% capric acid/4% Neodol 45-7 solutions by conventional heat/cool methods because their cloud points were too low. Solutions of 4% Neodol 45-7 with 0, 0.011, 0.025 and 0.054% capric acid were therefore prepared and their cloud points were determined. The cloud point of a 0.4% solution was calculated by extrapolation and yielded a value of −15° C. Since the cloud point of a 4% Neodol 45-7 in water is approximately 32° C., the effect of capric acid is to greatly decrease the cloud point. This effect is consistent with the available literature. It must be stressed that this cloud point depression occurs only in acidic solution. Anionic surfactants, such as capric acid under alkaline conditions, lead to an increase in the cloud point. The addition of most electrolytes, such as sodium tripolyphosphate (STPP) and NaOH, is also known to decrease the cloud point. A notable exception is HCl which slightly increases the cloud point.

The cloud point of 0.4% capric acid/4% Neodol 45-7T (which is Neodol 45-7 that is substantially depleted in $EO_0$, $EO_1$, and $EO_2$ as shown in Table 1) is 1° C. (this can be measured by the conventional heat/cool method), which is approximately 40° below that of the surfactant in water. If we assume that the cloud point drops 40° for the Neodol 45-7 solution, one would expect a cloud point of −8° C., which is reasonably close to our extrapolated value of −15° C.

For most surfactants, there is not a significant concentration dependence to the cloud point. For Neodol 45-7, however, the cloud point for a 1% and 4% solution in pure water was 47° C. and 32° C., respectively. No such concentration dependence was noted for Neodol 45-7T; the cloud point of a 1% and 4% solution was 51° C. (Literature values for 1% solutions agree closely with the measured values.)

Thus, the cloud point of the surfactant mixture in the Standard Bleach Composition is well below room temperature. Phase separation will always occur in centrifuged samples as well as in commercial product. The extent of this separation will be determined by the kinetics.

4. Freeze-Thaw of Surfactant Solutions

Aqueous solutions of commercial surfactant (no other Standard Bleach Composition components) were subjected to freezing and thawing. The surfactants analyzed were the following Neodol mixtures: 25-7, 45-7, 45-13, and 45-7T. (See Table 1 for the oligomer distributions.) Surprisingly, upon freeze-thaw, solutions of 45-7 separated with a flaky, cloudy layer on top which did not redissolve upon standing but did redissolve with vigorous mixing. There was a concentration dependence to this observation. At 2% and above this behavior was noted but at 1% and below it was absent. The other Neodol mixtures (4% solutions), however, did not show this separation upon freeze-thaw (45-7T showed a slight amount of flakes but they rapidly redissolved upon standing). The flakes from the 4% Neodol 45-7 solution were isolated by oven drying at 50° C. and contained approximately only 3% solids by weight.

The fact that the separated phase was cloudy indicates a possible enhancement in shorter EO oligomers since the cloud point decreases with shorter EO chain length. It is noteworthy that Neodol 45-7 but not Neodol 45-7T exhibits this separation behavior. Since there are substantially fewer short EO oligomers in 45-7T, it would not be expected to form F/T flakes that are enhanced in these oligomers. With respect to Neodol 45-7 and 45-7T, by short EO oligomers is meant the $EO_0$, $EO_1$, and $EO_2$ oligomers. The oligomer distribution in these F/T Neodol 45-7 flakes and bulk solutions was confirmed by SFC and compared to the distribution to be found in the Standard Bleach Composition flakes, as described below. (Neodol flakes and Neodol bulk solution were used below to differentiate the water/surfactant system from those containing the Standard Bleach Composition matrix.)

5. Flake Analysis

The flakes were initially thought to be enhanced in brightener. The first attempt to isolate the flakes was to filter F/T Standard Bleach Composition samples (which showed a great deal of flaking) using a Buchner funnel and gentle vacuum. The filter paper was then washed with acidic water and was extracted with basic water in order to dissolve the brightener. The brightener has virtually no solubility under acidic condition while its solubility in base is substantial. No brightener could be detected from these extracts by visible absorbance. The limit of detection was such that less than 1% of the target value was present. The conclusion was that the flakes were easily broken apart upon gentle washing and vacuum and the brightener passed through the approximately 10 μm pore filter paper. Subsequent flake analysis used samples that were isolated by allowing the flakes to settle on the bottom of a petri dish and removing the excess liquid.

The F/T Standard Bleach Composition flakes were analyzed by NMR, visible absorbance, and SFC. Visible absorbance measurements, as described further below, were performed to quantitate the amount of brightener. The amount found in the flakes was 0.36%±0.05% which is very close to the amount of brightener in the Standard Bleach Composition (0.32%). Thus, the flakes or clumps are not brightener clumps but consist primarily of surfactant. The NMR analysis was consistent with this: the major peaks were due to Neodol, and the very small peaks due to brightener and capric acid were consistent with the target levels.

Figure 5A:
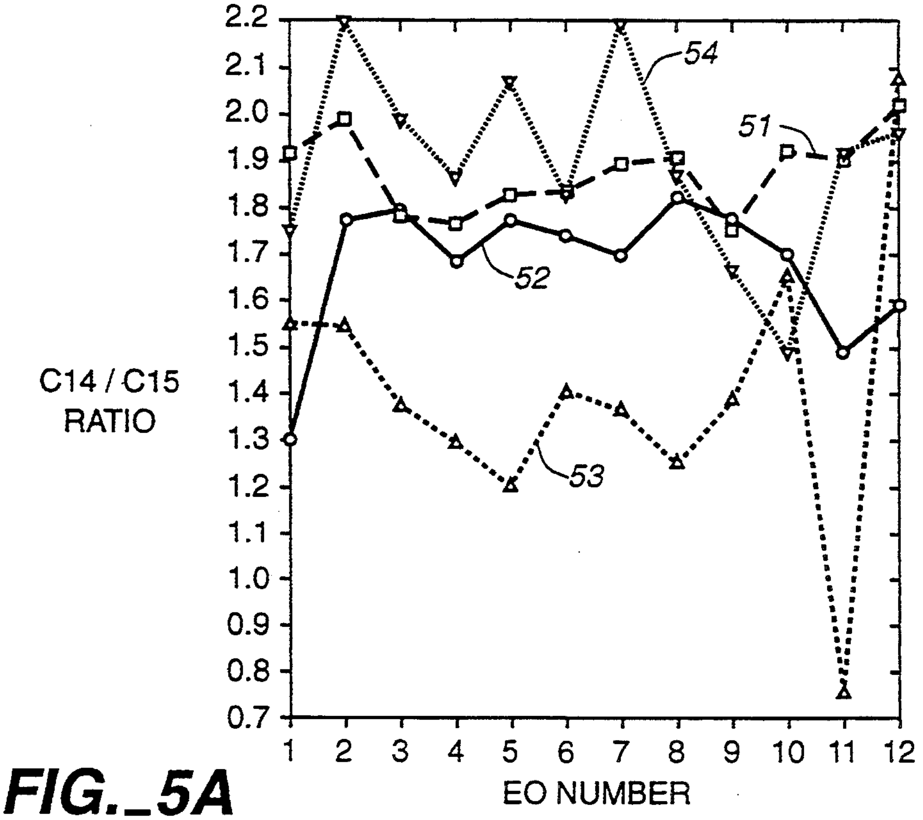
FIGS. 5A and 5B are graphs of the $C_{14}/C_{15}$ and $EO_x/EO_5$ ratios, respectively, versus EO number for flakes from various samples.
Figure 5B:
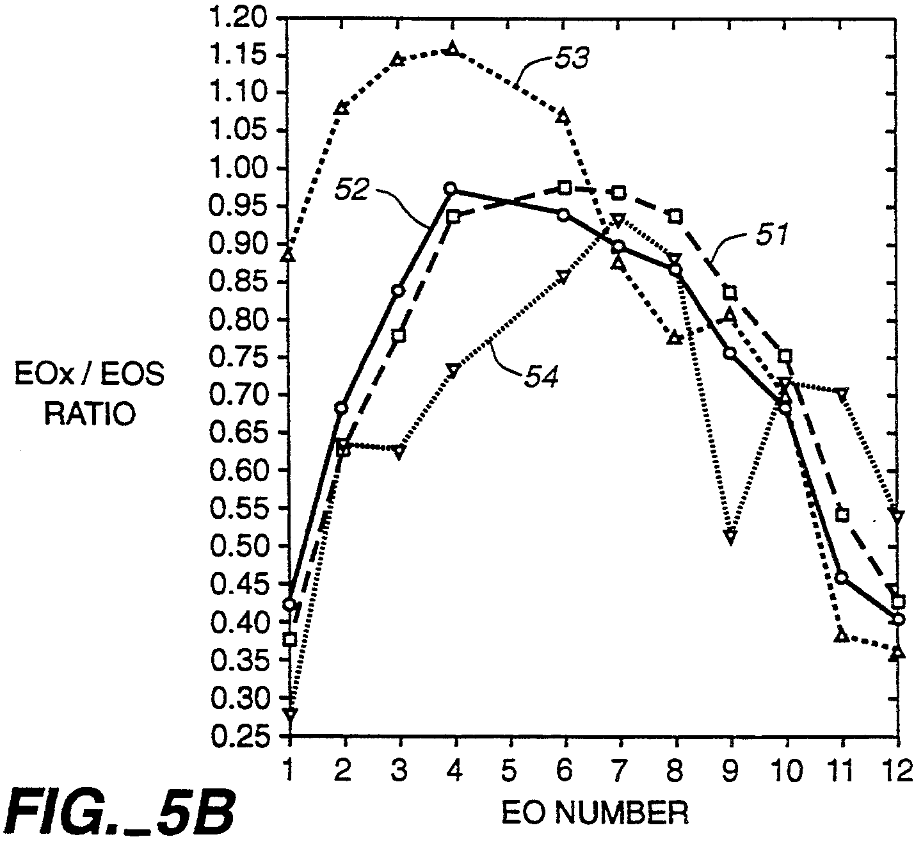
Figure 6A:
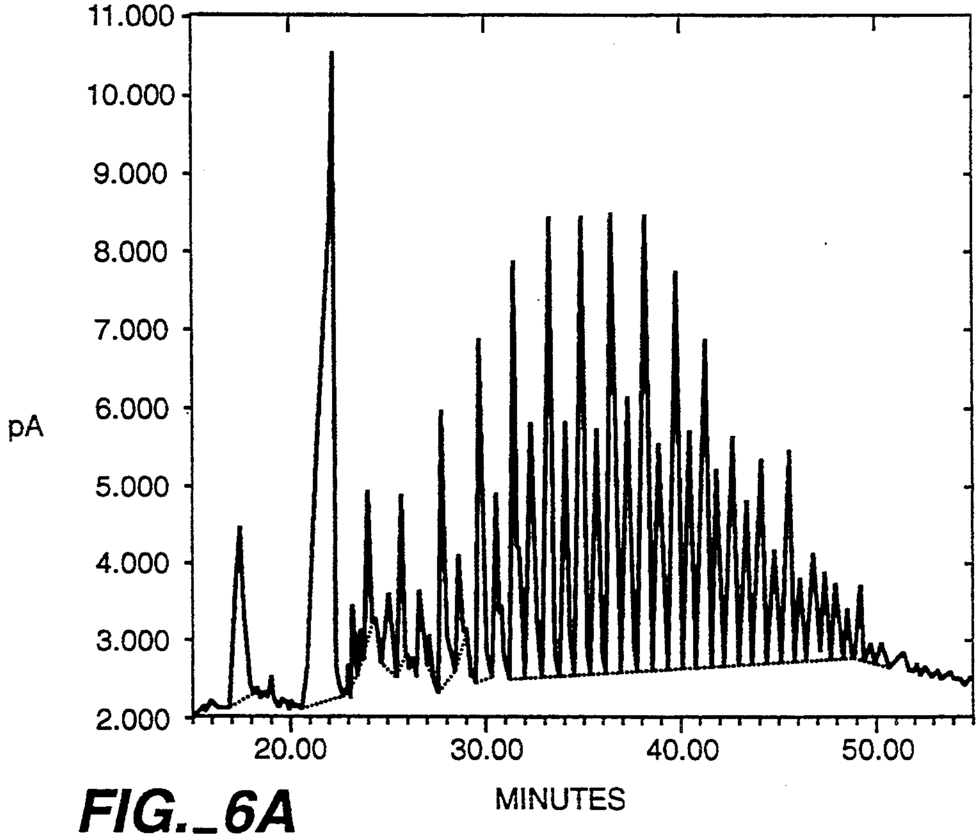
FIGS. 6A, 6B, and 6C are supercritical fluid chromatography (SFC) chromatograms for various solutions and flakes.
Figure 6B:
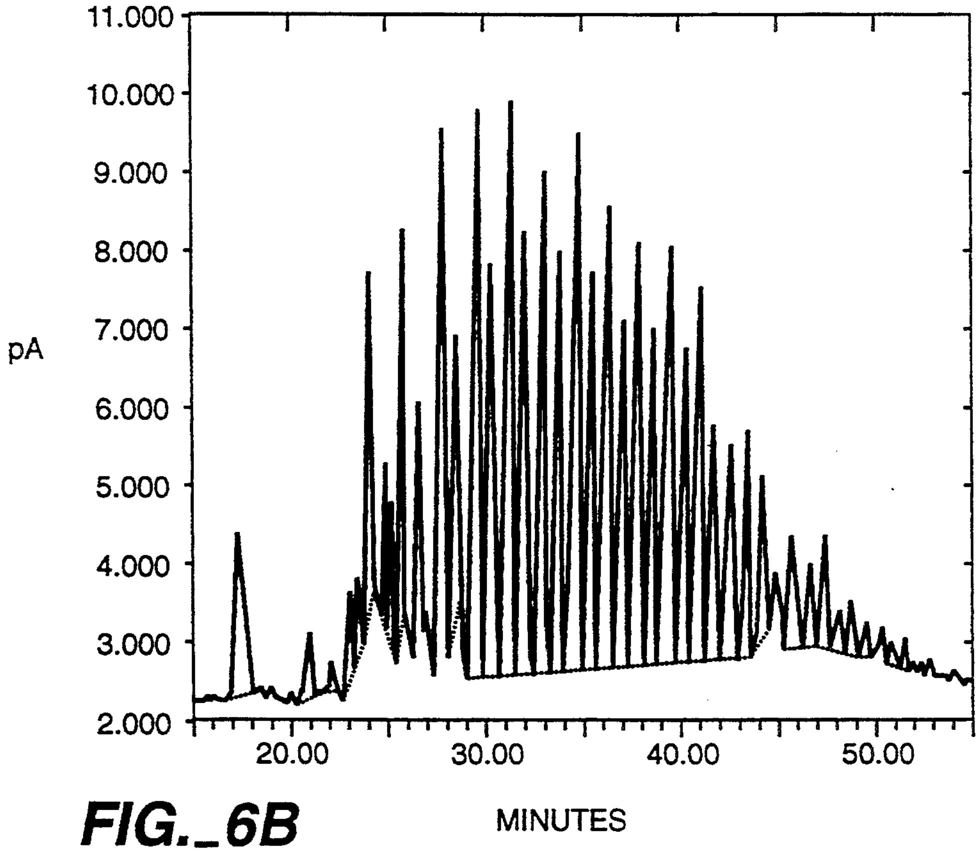
Figure 6C:
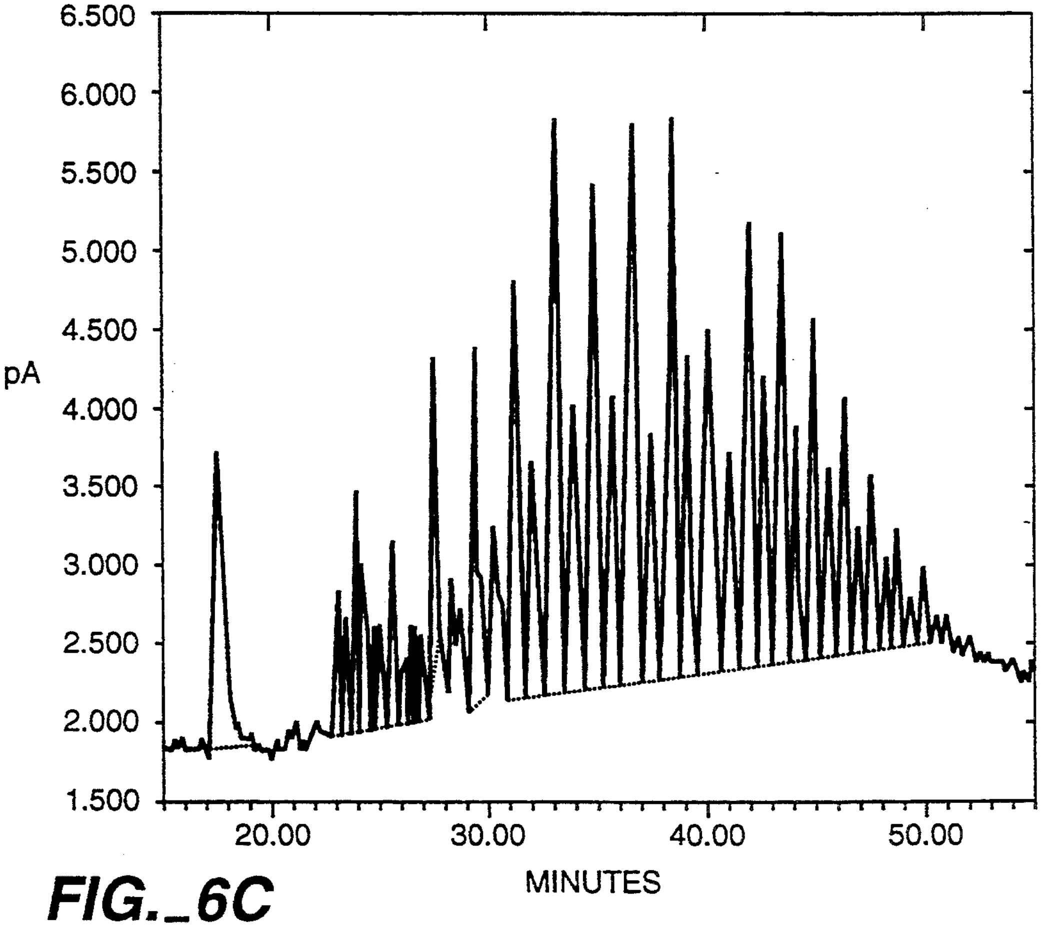

The SFC analysis, as described further below, was performed to determine the surfactant oligomer distribution in flakes. The four samples analyzed were: (1) Neodol 45-7/capric acid standard (referred to herein as the "standard"), (2) Standard Bleach Composition flakes, (3) F/T Neodol 47-5 flakes, and (4) F/T Neodol 45-7 bulk solution. Plots of the two ratios, $C_{14}/C_{15}$ and $EO_x/EO_5$ as a function of EO number are shown in FIGS. 5A and 5B, respectively, for the four flake samples. FIG. 6A is the SFC chromatogram of the Standard, FIG. 6B is the SFC chromatogram of the F/T flakes from the Neodol 45-7 solution, and FIG. 6C is the SFC chromatogram for the F/T solution of Neodol 45-7 (with flakes removed). The SFC chromatogram, which is not included, looks visually similar to that of the Standard.

From FIGS. 5A and 5B it is apparent that the F/T Neodol 45-7 data is very different from that of the Neodol 45-7 standard. The F/T Neodol 45-7 flakes (curve 53) are enriched in $C_{15}$ oligomers (relative to $C_{14}$) and enriched in the shorter EO oligomers. These are the hydrophobic oligomers. The F/T Neodol 45-7 bulk solution (curve 54) is analogously depleted in these same oligomers. Thus, upon F/T there is a separation of hydrophobic and hydrophilic oligomers into different phases.

The data for the Standard Bleach Composition flakes (curve 52) is much more similar to the standard (curve 51). There is, however, a slight but significant shift in the ratios for the flakes towards that found for the F/T Neodol 47-5 flakes. That is, the $C_{14}/C_{15}$ ratio is smaller (over most of the EO range) and, for $EO_1$–$EO_4$, the $EO_x/EO_5$ ratio is larger than they are for the standard. Thus, it appears that the Standard Bleach Composition flakes are slightly enhanced in the hydrophobic oligomers but not nearly to the degree that exists for the F/T Neodol 45-7 flakes. These data may, however, under represent the degree of hydrophobic enhancement in the Standard Bleach Composition flakes since the flakes were not completely separated from the bulk solution. The contribution from the bulk solution would shift the data towards that of the Standard.

Capric acid was also analyzed for the Standard Bleach Composition samples. Within experimental error, there was no difference between the Standard Bleach Composition samples and the standard. The uncertainty of the capric peak, however, was about twice that for the Neodol 45-7 peaks.

Literature values for the Krafft point for several of the pure ethoxylate oligomers are shown in Table 2. The Krafft point is the temperature below which the solubility of the surfactant drastically decreases. It is clear from the table that the Krafft temperature depends on alkyl and ethoxylate chain length as well as the presence of electrolytes. Although a polydisperse surfactant such as Neodol 45-7 may not behave as simply as these monodisperse surfactants, this Krafft point data provides a rationalization for the formation of these flakes upon F/T. That is, the lower EO oligomers have a higher Krafft temperature, and upon cooling and freezing, become insoluble and separate as flakes of solid hydrated surfactant. Upon the product thawing, these hydrophobic surfactants remain insoluble and can slowly redissolve back into solution. Liquid crystal formation has also been reported for $C_{12}EO_5$ with concentrations as low as 1% at elevated temperatures (58° C.).

TABLE 2

| Krafft Temperature for Several Pure Ethoxylate Oligomers | |
|---|---|
| Ethoxylate | Krafft Temperature (°C.) |
| $C_{12}EO_4$ | −11 |
| $C_{12}EO_5$ | −28 |
| $C_{12}EO_6$ | −57 |
| $C_{14}EO_7$ | <0 |
| $C_{14}EO_7$ + 3M NaCl | 22 |

Visible Absorbance Measurements. For the visible absorbance measurements, the petri dishes were oven dried at 50° C. for one to three days. After drying only 4% to 5% of the original weight remained. The dry flakes were then dissolved in 0.05M NaOH and transferred to 10 ml volumetric flakes and diluted with 0.05M NaOH. Absorbance was measured at 400 nm with a Spectronic 20D and compared to a series of standard Phorwite RKH solutions. The standard curve was linear over the range of typical sample absorbencies. The absorbance of the product's blue dye was determined to be insignificant at 400 nm.

Supercritical Fluid Chromatography Analysis.

For the supercritical fluid chromatography (SFC) chromatographic analysis, the flakes were not oven dried. The surfactant was isolated via $C_{18}$ sep pack. The flakes were slurred into the sep pack using water that had been adjusted to pH 4 (to avoid dissolving the capric acid and thus losing it) and then washed with this water. The surfactant was then eluted with acetone, blown down with $N_2$, and dissolved in chloroform. Several replicates were prepared as well as samples of F/T Neodol 45-7 flakes (see below) and a 4% Neodol/0.4% capric acid standard.

The SFC instrument, manufactured by Lee Scientific, used $CO_2$ as the mobile phase and utilized flame ionization detection. Isothermal, pressure programmed elution was used. The pressure program may be briefly summarized by the following: constant pressure, 80 atm, for 15 minutes, pressure ramp of 15 atm/min to 150 atm, ramp 3.7 atm/min up to 190, ramp 2.5 atm/min up to 250 atm, ramp 40 atm/min up to 300 atm.

The SFC analysis allowed the simultaneous determination of both the alkyl and ethoxylate (EO) oligomers. Peak heights that were hand measured from plotted chromatograms were used for quantitation because the instruments integration routine performed irreproducibly. Two ratios were calculated: (1) the $C_{14}/C_{15}$ ratio for each EO oligomer up to $EO_{12}$ and (2) the $EO_x/EO_5$ ratio, i.e., the ratio of each EO oligomer divided by the $EO_5$ oligomer (this was done using the $C_{14}$ alkyl oligomer).

The Standard Bleach Composition flake data had an average of 6 runs. The Neodol 47-5/capric standard had an average of four runs and the F/T Neodol 45-7 were each run only once. The standard deviations of the average ratios for the flakes and standard were approximately 6–8% while that for the F/T Neodol 45-7 data were correspondingly higher at approximately 15%.

6. Additives and Formula Changes

The intent of these experiments was to influence the F/T behavior through changes in the formula and/or additives. In the first set of experiments, product with the current Standard Bleach Composition formula was intentionally produced that would firmly fail the F/T test. The effect of additives on the F/T behavior of this unstable product was then evaluated. Product to which chemicals was added was produced at 50° F. (10° C.). A list of the additives appears in Table 3 which includes different surfactants, hydrotropes, cosolvents, and electrolytes. These were chosen with the intent of increasing the particle-particle stability against coagulation. These experiments were carried out prior to the flake analyses when the flakes were thought to be clumps of brightener.

Evaluation of the F/T behavior proceeded as follows: after freezing for 24 hrs at 0° F. (−17.8° C.) and thawing at room temperature for 24 hrs, the sample was inverted two or three times and then the relative flaking was assessed. This inversion removes almost completely the so-called marbling problem but leaves the flakes. It is believed that this is a more accurate visual method for evaluating the severity of the F/T problem.

The effect on the F/T behavior was disappointing because in no case was there improvement in the flaking after F/T. There was improvement to the amount of marbling with ethylene glycol. Additionally, some additives (notably SXS, and 8% ethanol) caused marked separation at room temperature upon standing.

The additives substantially influenced the product's viscosity. The addition of Neodol 45-13, SXS, and SDS all lead to reduced product viscosity whereas additional Neodol 45-7 increased the viscosity and the other additives had little noticeable impact. The addition of Neodol 45-13 and SDS would be expected to increase the surfactant cloud point, and as discussed previously, a higher cloud point would lead to increased particle stability and reduced flocculation. Thus, greater particle stability is accompanied by lower viscosity. Product made solely with surfactant possessing a higher cloud point showed a similar reduction in viscosity.

TABLE 3

| Chemicals Added to F/T Unstable Standard Bleach Composition | |
|---|---|
| Additive | Weight Percent |
| Neodol 45-7 | +4 (8% total) |
| Neodol 45-13 | 4 |
| sodium dodecyl sulfate | 4 |
| ethylene glycol | 1, 2, 4, 6, 8 |
| ethanol | 1, 8 |
| sodium xylene sulfonate | 6 |
| propylene glycol | 1, 8 |
| NaCl | 1.7 |

In the second set of experiments, Neodol 45-7 was replaced with different surfactants. In each case, the product was made using active temperature control at cold temperatures (that is below about 59° F. (15° C.)) which is known to produce F/T unstable product with the current formula. The F/T behavior was then compared to the Standard Bleach Composition formula (4% Neodol 45-7). These experiments were conducted in response to the F/T behavior of pure surfactants and the results of the flake analysis, as outlined above. Since Neodol 45-7 was the only surfactant in pure water that separated upon freeze thaw, it was thought that perhaps changing the surfactant would reduce F/T flaking. Also, since the flakes are enhanced in hydrophobic oligomers, choosing a surfactant with reduced hydrophobic oligomers was anticipated to reduce flaking.

Table 4 lists the surfactants investigated. They are grouped into two columns according to the improvement in F/T flaking. Only two surfactants, Nikkol $C_{14}EO_7$, which consists essentially of $C_{14}EO_7$, and manufactured by Nikko Chemical Company, Tokyo, Japan, and Neodol 45-7T, resulted in any improvement. For the Nikkol sample, no flaking was observed, although phase separation occurred upon standing. For the Neodol 45-7T sample, the amount of flaking was significantly reduced. Both of these results support the conclusion that the flakes are hydrophobic surfactant oligomers rather than brightener clumps. The lack of flakes in the Nikkol sample is because the surfactant is monodisperse and thus contains no short, hydrophobic oligomers. (It is unlikely that $C_{14}EO_7$ is uniquely capable of stabilizing brightener particles against coagulation.) The reduced amount of flakes in the 45-7T sample is due to the reduced amounts of $EO_0$-$EO_2$, the hydrophobic oligomers.

It is surprising, however, that Genapol 26-L-60N (manufactured by Hoechst Celanese Corporation) showed no improvement in F/T flaking. This surfactant is a narrow cut that is depleted in both short and long ethoxylate oligomers and thus enhanced in the mid-range. Perhaps the long oligomers play a necessary role in solubilizing the short and mid-range oligomers.

TABLE 4

Effect of Replacing Neodol 45-7 With Different Surfactants on F/T Behavior

| Improvement | No Improvement |
|---|---|
| Nillol $C_{14}EO_7$ | Neodol 23-6.5 |
| Neodol 45-7T | Neodol 25-7 |
| | Neodol 25-9 |
| | Neodol 45-7 (1%) |
| | Neodol 45-13 |
| | Surfonic 46-7 |
| | Genapol 25-L-60N |

(All surfactant concentrations are 4% except Neodol 45-7. Surfonic 46-7 (manufactured by Texaco, Inc.) is a mixture of 14 to 16 carbon chain length polyethoxylated alcohols with about 7 ethylene oxide groups per molecule.)

7. Flake Re-dissolution, Product Transformation

The formation of flakes upon F/T is not an irreversible process. The flakes have been observed to slowly redissolve into solution upon standing for several weeks and vigorous, prolonged stirring can also effect re-dissolution. Moreover, product that is F/T unstable can be transformed into stable product. For example, stirring at 50° C. for 1 hour transformed F/T unstable, green product into F/T stable product. Thus, heating and stirring is a possible remedy for plant produced product that fails the F/T test.

Components of Thickening System. As described above, the inventive thickening system, useful for forming freeze-thaw stable cleaning and bleaching compositions, comprise nonionic surfactants that are preferably substantially hydrophilic polyethoxylated alcohols. The surfactant functions as one component of the thickening system which includes the pH adjusting agent and fluorescent whitening agent. The surfactant is present in the solution in an amount sufficient to stabilize the fluorescent whitening agent, generally about 1 to 20% by weight, more preferred is 1 to 10% by weight, and the most preferred range is about 2 to 5%. The surfactant must be compatible with an acidic pH and, in embodiments of the invention incorporating a bleach, must be resistant to oxidation by the bleach. It has been empirically determined that thickening-effective nonionic surfactants have a hydrophobic-lipophobic balance (HLB) of between about 11–13.

Aside from the ingredients specifically described above, others that comprise the inventive thickening system and freeze-thaw stable, thickened aqueous peroxygen bleaching compositions are disclosed in U.S. Pat. No. 4,764,302, inventors Baker et al., issued Aug. 16, 1988, and incorporated herein by reference. Some of these ingredients are also described hereinbelow.

A. pH Adjusting Agent. It is essential that the pH range of the thickening system or bleach composition be compatible with the pH range of insolubility of the fluorescent whitening agents. Because acid-insoluble fluorescent whitening agents are used, the composition pH must also be acidic in order to maintain the fluorescent whitening agents in an undissolved state. Preferably, the pH adjusting agent is added in an amount sufficient to adjust the pH range of the thickening system or bleach composition to between about 2 and 6, and more preferably to between about 3 and 5. Resulting viscosities may vary slightly depending on the type of acid used, and the final pH.

It is to be understood that any agent added to the composition which results in the insolubilizing, thickening-effective pH is considered to be a pH adjusting agent even if pH adjustment is not its sole or primary function. Further, order of addition of other composition ingredients relative to the pH adjusting agent is not critical, although it is preferred to have the surfactant present when the fluorescent whitening agents are precipitated by the pH adjusting agent. For this reason, it is preferred that the pH adjusting agent be added to a mixture of the desired composition ingredients, i.e., surfactant and fluorescent whitening agent plus any optional components. Inorganic acids such as sulfuric acid ($H_2SO_4$), phosphoric acid ($H_3PO_4$), and hydrochloric acid (HCl) are preferred for pH adjustment. Organic acids, such as acetic acid, will also function. It is noted that depending on the composition, the addition of a separate acid may not be necessary to adjust the pH to the correct level. Many chelating agents are acidic and compositions utilizing such chelating agents may not need further added acid.

B. Fluorescent Whitening Agent. The fluorescent whitening agent, also referred to as an optical brightener, is an essential component of the thickening system of the invention, and associates with the surfactant to achieve the thickening. Such products are fluorescent materials, often substituted stilbenes and biphenyls, and have the ability to fluoresce by absorbing ultraviolet wave-lengths of light and re-emitting visible light. A preferred fluorescent whitening agent is sold by the Ciba Geigy Corporation under the tradename "Tinopal," which are substituted stilbene 2,2'-disulfonic acid products. Preferred Tinopal products are Tinopal 5BM-XC, a 4,4'-Bis[[4,4'-anilino-6[N-2-hydroxyethyl-N-methylamino]-1,3,5-triazin-2-yl]amino]-2,2'-stilbene disulfonic acid disodium salt; Tinopal UNPA, a 4,4'-Bis [[4-anilino-6-[Bis(2-hydroxyethyl)amino]-1,3,5-triazin-2-yl]amino]-2,2'-stilbene disulfonic acid; and Tinopal AMS, a 4,4'-Bis[(4-anilino-6-morpholino-1,3,5-triazin-2-yl)amino]-2,2'-stilbene disulfonic acid. The fluorescent whitening agent is present in an amount necessary to thicken to the desired viscosity. Typically the amount of fluorescent whitening agent is from about 0.1 to about 10% by weight of the thickening system or bleach composition. More preferred is about 0.1 to about 5% by weight, and most preferred is about 0.2 to about 0.5%. Also suitable as fluorescent whitening agents are stilbene-type FWAs sold commercially by Mobay Chemical Corp. under the trademarks Phorwite RKH and Phorwite HRS.

Generally, thickening-effective FWAs comprise those having a molecular weight of between about 500–1500 grams/mole, a potential for a zwitterionic charge distribution (i.e., both positive and negative charge on the same molecule), which are insoluble at a pH of below about seven and which will precipitate as a colloidal-sized particle. More preferably, the FWA should have a molecular weight of between about 700–1000 grams/mole and a zwitterionic charge distribution wherein equal numbers of positive and negative charges are developed, should precipitate as a colloidal particle of under about 10 microns in size and should also be soluble at a basic pH. Most preferred as FWA are those possessing the stilbene structure, with the potential for a negative charge supplied by sulfonic acid groups and the potential for a positive charge supplied by protonated amine groups.

An example of a class of thickening effective FWAs are those which fall within the American Society for Testing Materials (ASTM) class "DASC" (diamino stilbene disulfonic acid-cyanuric chloride) including DASC subclasses 1 through 5. Examples of DASC FWAs are published in ASTM's *List of Fluorescent Whitening Agents for the Soap and Detergent Industry*, ASTM Data Series DS53A, the disclosure of which is incorporated herein by reference. DASC whiteners all possess the 2,2'-stilbene disulfonic acid structure illustrated by the following figure:

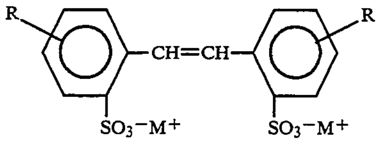

$M^+=H^+, Na^+, K^+$, etc.

R=a group capable of being protonated

Specific examples of DASC whiteners, include Ciba Geigy's trademarked Tinopal UNPA, UNPS, AMS, 4BM and 5BM, as well as Mobay Chemicals' trademarked Phorwite BBH, RKH, HRS and MBBH. For the purposes of the present invention, "fluorescent whitening agent" (FWA) is deemed to include dyes having structure and/or physical characteristics similar to the thickening-effective fluorescent whitening agent's and which are also thickening effective. Such dyes should also be insoluble at acidic pHs, have a potential for zwitterionic charge distribution and a molecular weight range of between about 500–1500 grams/-mole and precipitate as colloidal particles. A preferred class of dyes fitting the above general description of thickening-effective FWAs is the class or substituted biphenyl diazo dyes. A preferred example of this type of dye is a 3,3'-[biphenyl]-4,4'-diylbis-(azo)]bis[4-amino-1-naphthalene-sulfonic acid]disodium salt, sold commercially as Congo Red. Mixtures of any of the above FWAs can also be employed.

In order for the fluorescent whitening agent, in association with the surfactant, to thicken, it is necessary that the fluorescent whitening agent be precipitated out as a colloid. This is accomplished by formulating the thickening system with a low pH, on the order of 2–6 and preferably 3–5. The thickening system advantageously does not consume or remove the fluorescent whitening agents in achieving the thickening. The fluorescent whitening agents are thus fully available to perform their nominal function, e.g., whitening.

C. Soap. It has been found that viscosities can be synergistically increased by the inclusion of a fatty acid or esterified fatty acid soap. Generally $C_{6-18}$ a soaps provide the synergistic increase in thickening. Preferred are saturated, alkyl $C_{6-18}$ soaps, although varying degrees of unsaturation, branching, or esterification will not eliminate the viscosity enhancing effects of the soap. Most preferred are capric acid, lauric acid, myristic acid, and coconut fatty acid (having a chain length distribution of ten to eighteen carbons, and about 55% $C_{12}$) soaps, as well as methyl laureate, or mixtures of any of the foregoing. Because the solubility of the acid form is generally not very good, it is preferred to neutralize the fatty acid soap in situ using a base such as an alkaline-earth-metal or alkali-metal hydroxide. KOH and NaOH are the most preferred bases. Of course, addition of the salt form of the soap also gives acceptable results. A preferred amount of soap is that sufficient to improve viscosity, and typically is about 0.05 to 5.0 weight percent, more preferred is 0.1 to 1.0 weight percent and most preferred is 0.3 to 0.5 weight percent of the thickening system or bleach composition. When soap is incorporated into the composition of the invention, it is preferred to make an aqueous solution of the desired surfactant, add thereto an amount of base, most preferably NaOH, calculated to neutralize the amount of fatty acid to be added, then add the fatty acid. The FWA is added to this solution and pH adjustment is typically the final step.

In another embodiment the present invention is formulated as a thickened bleaching product that includes, in aqueous solution: a bleach and the thickening system comprising the surfactant, fluorescent whitening agent, and pH adjusting agent. The thickening system is identical to that described above. The remaining component, e.g., the bleach is further described below.

D. Bleach. A liquid bleach source may be selected from various types of bleaches such as halogen, peroxygen and peracid bleaches. The thickening system is compatible with any oxidant bleach which can be suspended in it. In general, the bleach must also be compatible with the acid pH necessary to precipitate the fluorescent whitening agent. The bleach must be able to supply to oxidizing species at the acid pH, and should be resistant to degradation thereby. Halogen bleaches are ordinarily ineffective at acid pHs and are therefore not preferred. It is noted that ionic strength associated with halogen bleaches is neither a prerequisite nor a hindrance to the thickening system; thickening will occur in the presence or absence of ionic strength.

Preferred as bleaches are the peroxygen or peracid bleaches. Peroxygen bleaches are preferred in terms of manufacturing cost. Peracid bleaches may be advantageous in terms of bleaching performance. If a peracid bleach formulation is desired, the thickener of the present invention is an ideal system for suspending peracids. The bleach is present in an amount sufficient to provide effective bleaching, e.g., from about 0.05 to 50% by weight active, more preferably from about 0.1 to 35% by weight active and most preferably from about 0.5 to 15% by weight active depending on the bleaching species chosen. The bleach may be added as an aqueous solution of active ingredient.

In another embodiment, the invention is formulated as a stabilized, thickened peroxide bleach, and includes, in aqueous solution: a peroxide bleach; the thickening system comprising the surfactant, fluorescent whitening agent, and pH adjusting agent; and a stabilizing system including a chelating agent and antioxidant. The thickening system is again as described in the previous embodiments. The remaining components are described in further detail below.

E. Peroxide. A hydrogen peroxide source is present as the principal active ingredient and functions as the bleaching agent. The hydrogen peroxide is normally supplied as liquid hydrogen peroxide, although other hydrogen peroxide sources may also function satisfactorily. For example perborate and percarbonate also supply $H_2O_2$ in solution. The peroxide is present in the range of about 0.05–50% by weight active, more preferred is 0.1–35% by weight active, and most preferred is 0.5–15% by weight active.

F. Stabilizing System. Stabilization of the bleaching composition of the present invention, including the hydrogen peroxide, fluorescent whitening agent, surfactants and any optional dyes and fragrances relies upon the presence of a metal chelating agent. The stabilizing system preferably comprises an antioxidant and a chelating agent that are known in the art. It is thought that the chelating agent acts to sequester heavy metal cations, especially polyvalent metals such as copper and iron which are present in small amounts among the mineral components in water. These heavy metal cations normally have the ability to catalyze peroxide homolysis and to mediate free-radical generation. These capabilities are inhibited by the chelating agent. The stabilizing system also includes an antioxidant which appears to work by tying up free-radicals initially formed in the solution, removing the ability of free-radicals to degrade organic components and also stopping the self-propagating free-radical cascade reaction. By such a mechanism, destruction of the surfactants, fluorescent whitener and optional oxidizable components (e.g., fragrance and dye) is arrested or reduced. Both the chelating agent and antioxidant should be present to attain the desired stability of the peroxide bleaching composition. However, less preferred embodiments of the invention can omit either the chelating agent or antioxidant.

The chelating agent may be selected from a number of known agents which are effective in chelating heavy metal cations. The chelating agent should be resistant to hydrolysis and oxidation by oxidants. Preferably it should have an acid dissociation constant (pKa) of about 1–9, indicating that it dissociates at low pH's to enhance bonding to metal cations. The most preferred chelating agent is an amino polyphosphonate which is commercially available under the trademark "Dequest" and sold by the Monsanto Company. Specific examples of effective Dequest products include Dequest 2000, Dequest 2010, Dequest 2041 and Dequest 2060.

Other related chelating agents such as pyrophosphates may also be utilized. EDTA-type chelating agents will also perform well. The chelating agent should be present in an amount sufficient to tie up any heavy metal cations present in the solution. The preferred range is 0.02 to 5% by weight, more preferred 0.04 to 3% by weight, and most preferred is 0.06 to 1.0% by weight.

The second component of the stabilizing system is the antioxidant which functions as a free-radical scavenger. Preferred for this purpose are substituted phenols, or more broadly, hydroxy benzenes. Of this class of compounds, butylated hydroxy toluene (BHT) and mono-t-butyl hydroquinone (MTBHQ) have been found to be especially effective. The antioxidant must resist oxidation by $H_2O_2$ and therefore cannot be too strong a reducing agent. It is also desirable that the anti-oxidant hydroxy benzenes be partially hindered, i.e., have a substituent alkyl or similar group attached to some of the reactive sites on the ring structure. It is necessary to block some of the reactive sites so that reactions with multiple available free-radicals resulting in polymerization and possible phase separation do not occur. BHT and MTBHQ satisfy all of the above criteria and are therefore preferred as antioxidants. BHT is commercially available from the Uniroyal Chemical Company, while MTBHQ is commercially available from the Eastman Chemical Company. Only very small amounts of antioxidant are necessary in the bleach composition. A preferred range is about 0.005–0.4% by weight, more preferred is 0.007–0.03% by weight, and most preferred is 0.01–0.02 by weight.

G. Optional Ingredients. Optionally, the peroxide bleaching composition may include small amounts of components such as fragrances, commercially available from, for example, International Flavors and Fragrances, and dyes such as acid blue. It is also contemplated that fluorescent whitening agents or dyes which do not fall within the thickening-effective classification could be added to perform only their whitening or dying function. Thickening-effective fluorescent whitening agents would, of course be present to both thicken and whiten, and the extra fluorescent whitening agents would serve to increase brightening without increasing thickening. The balance of the formulation is, of course, water. It is preferred for stability purposes to use deionized or distilled water to reduce metal ion contaminates to as low a level possible. It may be noted however, that even with metal ion contamination of 2–10 ppm or more, the stabilizing system of the present invention remains effective.

It is to be understood that while the invention has been described above in conjunction with preferred specific embodiments, the description and examples are intended to illustrate and not limit the scope of the invention, which is defined by the scope of the appended claims.

It is claimed:

1. A thickening system for a cleaning or bleaching composition, comprising in aqueous solution:
- an acid-insoluble fluorescent whitening agent (FWA) that comprises about 0.1 to 10 weight percent of said aqueous solution;
- a FWA-stabilizing amount of a nonionic surfactant that comprises polyethoxylated alcohol having the structure $$CH_3(CH_2)_n(OCH_2CH_2)_xOH$$

wherein n is about 11 to about 14 and x is from 0 to about 20, wherein the average number of ethylene oxide groups per molecule is about 6–10, and wherein the amount of polyethoxylated alcohols having x equal to 0, 1, or 2 comprises less than about 10% by weight of the total amount of polyethoxylated alcohols; and
- a pH-adjusting agent in an amount sufficient to precipitate the FWA as a colloidal particle;
- the thickening system being effective as a freeze-thaw-stabilizer of the composition.

2. The thickening system as defined in claim 1 wherein n is 13 or 14.

3. The thickening system as defined in claim 2 wherein the average number of ethylene oxide groups per molecule is about 7.

4. The thickening system as defined in claim 3 wherein the FWA is selected from the group consisting of nonionics, betaines, alkyl aryl sulfonates, and mixtures thereof.

5. The thickening system as defined in claim 4 wherein the surfactant is present in an amount of from about 1 to 20 percent by weight.

6. The thickening system as defined in claim 5 wherein the pH-adjusting agent is an acid and the thickening system has a pH between about 2 and 6.

7. The thickening system as defined in claim 1, further comprising in aqueous solution a stabilizing-effective amount of fatty acid soap.

8. The thickening system as defined in claim 7 wherein the fatty acid soap constitutes about 0.05 to 5.0 weight percent of said thickening system and the soap comprises a $C_{6-8}$ fatty acid.

9. A thickened, aqueous peroxygen bleaching composition, comprising:

a peroxygen bleach, present in a bleach-effective amount;

an acid-insoluble fluorescent whitening agent (FWA) that comprises about 0.1 to 10 weight percent of said composition;

a FWA-stabilizing amount of a nonionic surfactant comprising polyethoxylated alcohols having the structure $$CH_3(CH_2)_n(OCH_2CH_2)_xOH$$

wherein n is about 11 to about 14 and x is from 0 to about 20, wherein the average number of ethylene oxide groups per molecule is about 6–10, and wherein the amount of polyethoxylated alcohols having x equal to 0, 1, or 2 comprises less than about 10% by weight of the total amount of polyethoxylated alcohols; and a pH-adjusting agent in an amount sufficient to precipitate the FWA as a colloidal particle whereby a homogeneous composition having a viscosity of at least about 50 cP results;

the thickened composition being freeze-thaw stable.

10. The thickened composition as defined in claim 9 wherein n is 13 or 14.

11. The thickening composition as defined in claim 10 wherein the average number of ethylene oxide groups per molecule is about 7.

12. The thickened composition as defined in claim 11 wherein the FWA is selected from the group consisting of nonionics, betaines, alkyl aryl sulfonates, and mixtures thereof.

13. The thickened composition as defined in claim 12 wherein the surfactant is present in an amount of from about 1.0 to 20 percent by weight.

14. The thickened composition as defined in claim 13 wherein the pH-adjusting agent is an acid and the composition has a pH between about 2 and 6.

15. The thickened composition as defined in claim 9, further comprising a stabilizing-effective amount of fatty acid soap.

16. The thickened composition as defined in claim 15 wherein the fatty acid soap constitutes about 0.05 to 50 weight percent of the composition and the soap comprises a $C_{6-18}$ fatty acid.

17. A method of preparing a thickening system for use in forming a freeze-thaw stable cleaning composition, comprising:

(a) preparing an aqueous solution of a fluorescent whitening agent (FWA)-stabilizing amount of an acid-compatible and bleach-resistant surfactant that comprises polyethoxylated alcohols having the structure $$CH_3(CH_2)_n(OCH_2CH_2)_xOH$$

wherein n is about 11 to about 14 and x is from 0 to about 20, wherein the average number of ethylene oxide groups per molecule is about 6–10, and wherein the amount of polyethoxylated alcohols having x equal to 0, 1, or 2 comprises less than about 10% by weight of the total amount of polyethoxylated alcohols;

(b) adding to said aqueous solution formed in step (a) about 0.1 to 10 weight percent of an acid-insoluble FWA; and (c) thereafter adding sufficient pH-adjusting agent to result in a pH of between about 2 to 6 whereby the FWA precipitates as a colloid.

18. The method as defined in claim 17 wherein n is 13 or 14.

19. The method as defined in claim 18 wherein the average number of ethylene oxide groups per molecule is about 7.

20. The method as defined in claim 19 wherein the FWA is selected from the group consisting of nonionics, betaines, alkyl aryl sulfonates, and mixtures thereof.

21. The method as defined in claim 20 wherein the surfactant is present in an amount of from about 1 to 20 percent by weight.

22. The method as defined in claim 21 wherein the pH-adjusting agent is an acid and the composition has a pH between about 2 and 6.

23. The method as defined in claim 22 further comprising the step of adding a bleaching-effective amount of an aqueous bleach solution.

24. The method as defined in claim 17 wherein the thickening system is effective as a freeze-thaw stabilizer of a cleaning composition.

25. The method as defined in claim 17, further comprising adding a stabilizing amount of a fatty acid soap whereby the soap can be added before, during, or after step (a), (b), or (c).

26. The method as defined in claim 25 wherein the fatty acid soap constitutes about 0.05 to 5.0 weight percent of the thickening system and the soap comprises a $C_{6-18}$ fatty acid.

27. The method of preparing a freeze-thaw stable bleach composition, comprising the method of preparing a thickening system as defined in any one of claims 17 and 25, and further comprising adding the thickening system resulting from said method to a bleach-effective amount of a bleach composition.

28. The method as defined in claim 27 wherein the thickening system is effective as a freeze-thaw-stabilizer of the bleach composition.

* * * * *

UNITED STATES PATENT AND TRADEMARK OFFICE

CERTIFICATE OF CORRECTION

PATENT NO. : 5,425,898
DATED : June 20, 1995
INVENTOR(S) : Phillippi et al.

It is certified that error appears in the above-indentified patent and that said Letters Patent is hereby corrected as shown below:

In Column 19, Line 18 in Claim 8:
replace "comprises a $C_{6-8}$ fatty acid." with --comprises a $C_{6-18}$ fatty acid.--

Signed and Sealed this

Second Day of July, 1996

Attest:

BRUCE LEHMAN

Attesting Officer

Commissioner of Patents and Trademarks